(12) United States Patent
Seah et al.

(10) Patent No.: US 10,795,907 B2
(45) Date of Patent: Oct. 6, 2020

(54) MANAGEMENT OF DATA SOURCES IN DATABASE SYSTEM

(71) Applicant: SAP SE, Walldorf (DE)

(72) Inventors: Vei Ming Seah, Cupertino, CA (US); Johan Raffin, Mountain View, CA (US); Marius Obert, San Francisco, CA (US)

(73) Assignee: SAP SE, Walldorf (DE)

( * ) Notice: Subject to any disclaimer, the term of this patent is extended or adjusted under 35 U.S.C. 154(b) by 225 days.

(21) Appl. No.: 15/175,068

(22) Filed: Jun. 7, 2016

(65) Prior Publication Data
US 2017/0351741 A1   Dec. 7, 2017

(51) Int. Cl.
| | |
|---|---|
| G06F 16/26 | (2019.01) |
| G06F 3/0482 | (2013.01) |
| G06F 3/0484 | (2013.01) |
| G06F 16/25 | (2019.01) |

(52) U.S. Cl.
CPC ........... *G06F 16/26* (2019.01); *G06F 3/0482* (2013.01); *G06F 3/0484* (2013.01); *G06F 16/252* (2019.01)

(58) Field of Classification Search
CPC ................. G06F 3/048; G06F 17/3056; G06F 17/30893; G06F 16/20–29; G06F 16/25–258; G06F 16/23–2393; G06F 16/26; G06F 16/252
See application file for complete search history.

(56) References Cited

U.S. PATENT DOCUMENTS

| | | | | |
|---|---|---|---|---|
| 6,801,229 B1* | 10/2004 | Tinkler | ............... | G06F 16/9038 715/853 |
| 2004/0243593 A1* | 12/2004 | Stolte | ................ | G06F 17/30592 |
| 2011/0035744 A1* | 2/2011 | Bhatia | ............... | G06F 17/30893 717/174 |
| 2015/0310075 A1* | 10/2015 | Mescal | ................. | G06F 16/211 707/805 |
| 2016/0034518 A1* | 2/2016 | Sood | .................... | G06F 3/04842 707/690 |
| 2016/0335303 A1* | 11/2016 | Madhalam | .......... | G06F 16/2455 |

OTHER PUBLICATIONS

"File Transfer Protocol." Wikipedia, Wikimedia Foundation, May 7, 2018, en.wikipedia.org/wiki/File_Transfer_Protocol.*
"Hypertext Transfer Protocol." Wikipedia, Wikimedia Foundation, May 12, 2018, en.wikipedia.org/wiki/Hypertext_Transfer_Protocol.*

* cited by examiner

*Primary Examiner* — Liang Y Li
(74) *Attorney, Agent, or Firm* — Fish & Richardson P.C.

(57) ABSTRACT

A data exploring application is defined for communicating with different types of data sources comprising data sets. The data exploring application includes an interface and a back-end module. The interface receives requests for connecting with a data source of a defined type. The type of the data source is associated with specific requirements for establishing the connection. The interface receives requests for exploring a hierarchy of data sets of a selected data source from the connected data sources. The interface communicates with a back-end module of the application to provide data associated with requested hierarchy levels from the hierarchy of the data sets. Based on received responses from the back-end module of the application, browsing and editing options are generated at the interface for receiving a selection of a data set from the hierarchy of data sets of the selected data source.

19 Claims, 7 Drawing Sheets

MANAGEMENT OF DATA SOURCES IN DATABASE SYSTEM

TECHNICAL FIELD

The field generally relates to database systems, data source management and data processing.

BACKGROUND

Data may be stored in data sets associated with a database system. The data sets may be imported into the database system, may be created thereon, or may be on remote data sources coupled to the database system. The database system is in connection with the remote data sources, which may be databases or data warehouses of different types. Based on the type of the remote data source, a different type of a connection is established. The data sets, stored locally or remotely to the database system may also be of different formats. Some data sets are stored as database tables or database views within the database system or at a remote data source associated with the database system. Other data sets may be stored into files in an Excel file format or in a comma-separated value (CSV) file format. The data sets are accessed and comprised data are analyzed for different purposes. Data within the data sets may be manipulated based on different criteria. For analyzing the data, the data sets may be filtered and data from different data sets may be assembled for the analysis.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for managing data sources in database system are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
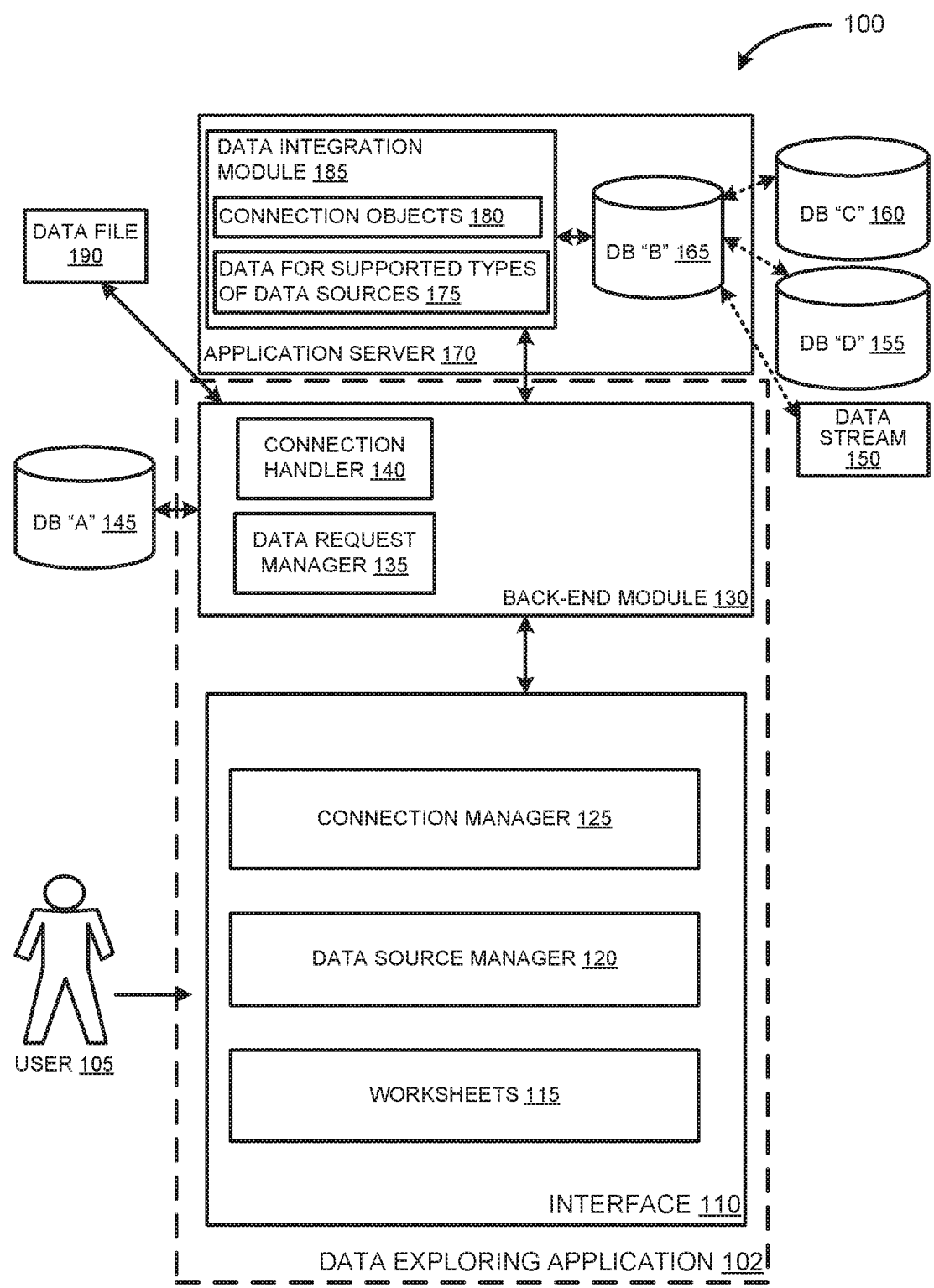
FIG. 1 is a block diagram illustrating an exemplary environment for managing data source associated with a database system, according to one embodiment.

FIG. 1 is a block diagram illustrating an exemplary environment 100 for managing data source associated with a database system, according to one embodiment. The database system includes applications associated with different data resources including databases, file sources, streams, etc. The databases of the database system may be of different type and be provided by different vendors. Different databases may require different configurations for establishing a communication.

In one embodiment, a data exploring application 102 part of the exemplary environment 100 includes an interface 110 and a back-end module 130. The data exploring application 102 manages communication with remote data sources for exploring hierarchies of data sets of the data sources. The data exploring application 102 is communicating over a connection with an application server 170, a data file 190, and a database (DB) "A" 145. The data exploring application 102 may access data stored on the application server 170 and/or in the data file 190 and/or the DB "A" 145. The application server 170, the data file 190 and the DB "A" 145 are data sources, which store data in form of data sets to be consumed by the data exploring application 102. The data exploring application 102 may transfer requests for accessing and navigating through data stored on the application server 170, the data file 190, and DB "A" 145. The data exploring application 102 may indirectly communicate with externally connected data sources to the application server 170. The application server 170 includes a data integration module 185 and a database (DB) "B" 165. The DB "B" 165 integrates data from different data sources external to the application server 170. The integrated data sources in the DB "B" 165 are database (DB) "C" 160, database (DB) "D" 155, and data stream 150. The DB "C" 160 and DB "D" 155 may be databases with different functional characteristics and software and hardware prerequisites. The DB "B" 165 may incorporate the data from the external sources and store it in database tables or virtual tables. The external data sources may be other databases of the same type as DB "B" 165, or of a different type or format. DB "B" 165 stores the data sets in database tables and/or virtual database tables, which integrate data sets from the external data sources. The stored data sets in DB "B" 165 may be stored together with metadata comprised in the external data sources DB "C" 160, DB "D", and data stream 150.

The data exploring application 102 provides the interface 110, which may be accessed by users, such as user 105. When user 105 requests interactions with the data exploring application 102, the interface 110 is loaded and becomes accessible for user interactions. The interface 110 provides access to worksheets 115, which include a set of data sets. The worksheets 115 may be used for performing analysis over the included data in the set of data sets, and/or to perform some aggregations over the included data. The worksheets 115 may be selected from the data sources that are in connection to the data exploring application 102, such as the DB "A" 145, the data file 190, or data stored on the application server 170, for example on the DB "B" 165. The interface 110 also provided a data source manager 120 and a connection manager 125. Connections between the data exploring application 102 and data sources may be defined through the connection manager 125. When a connection is defined, then the connected data source may be accessed and further information about the provided data from the data source may be determined. Through the data source manager 120, user 105 may determine a number of data sets from connected data sources to be accessed and further manipulated. For example, a connected data source may provide only one data set, which is in a table format. When the connected data source is accessed through the data source manager 120, metadata related to the stored data may be provided. Such metadata may include for example, a title of the table comprising the one data set, a list of the columns that are defined for the table, a corresponding type of data for the list of columns, etc.

The data exploring application 102 includes a back-end module 130, which is in communication with the interface 110. When a request for defining a connection with a data source, or for defining a set of data sets from the connected data source is received, the interface 110 communicates with the back-end module 130 to provide the requested operations. The back-end module 130 includes a connection handler 140 and a data request manager 135. The connection handler 140 communicates with the connection manager 125, when a request to establish a connection with a data source is received. The data source with which a connection may be defined may be selected from different data sources, which are related to the data exploring application 102. The data sources may be of different type. Different types of connections with different connection configuration parameters may be defined between the data exploring application 102 and the data sources based on the different types. The connection handler 140 assists in establishing the connection through defining the required parameters. The connection is configured based on the provided details with the request for establishing the connection. The configuration details may be provided by an end user.

The application server 170 includes a data integration module 185, which communicates with the back-end module 130 when establishing a connection between the data exploring application 102 and the application server 170. The data integration module 185 includes connection objects 180 corresponding to established connections between the application server 170 and external data sources, such as DB "C" 160, DB "D" 155, and data stream 150. A connection object from the connection objects 180 may be associated with a received request received from the back-end module 130 for establishing a connection with a given external data source to the application server 170. When such a request is received, a connection object is created and a connection between the application server 170 and the given external data source is created. The connection objects 180 include connection objects defined correspondingly when connections between the application server 170 and DB "C" 160, DB "D" 155, and data stream 150, are established. When establishing the connections, different parameters are defined. The parameters correspond to the specific type of a connection and the external data source for which the connection is created. The data integration module 185 further includes data for supported types of data sources 175.

The data for supported types of data sources 175 include details about the supported types of data sources to which a connection may be established. For a given supported type a list of required parameters for configuring a connection is defined.

Figure 2:
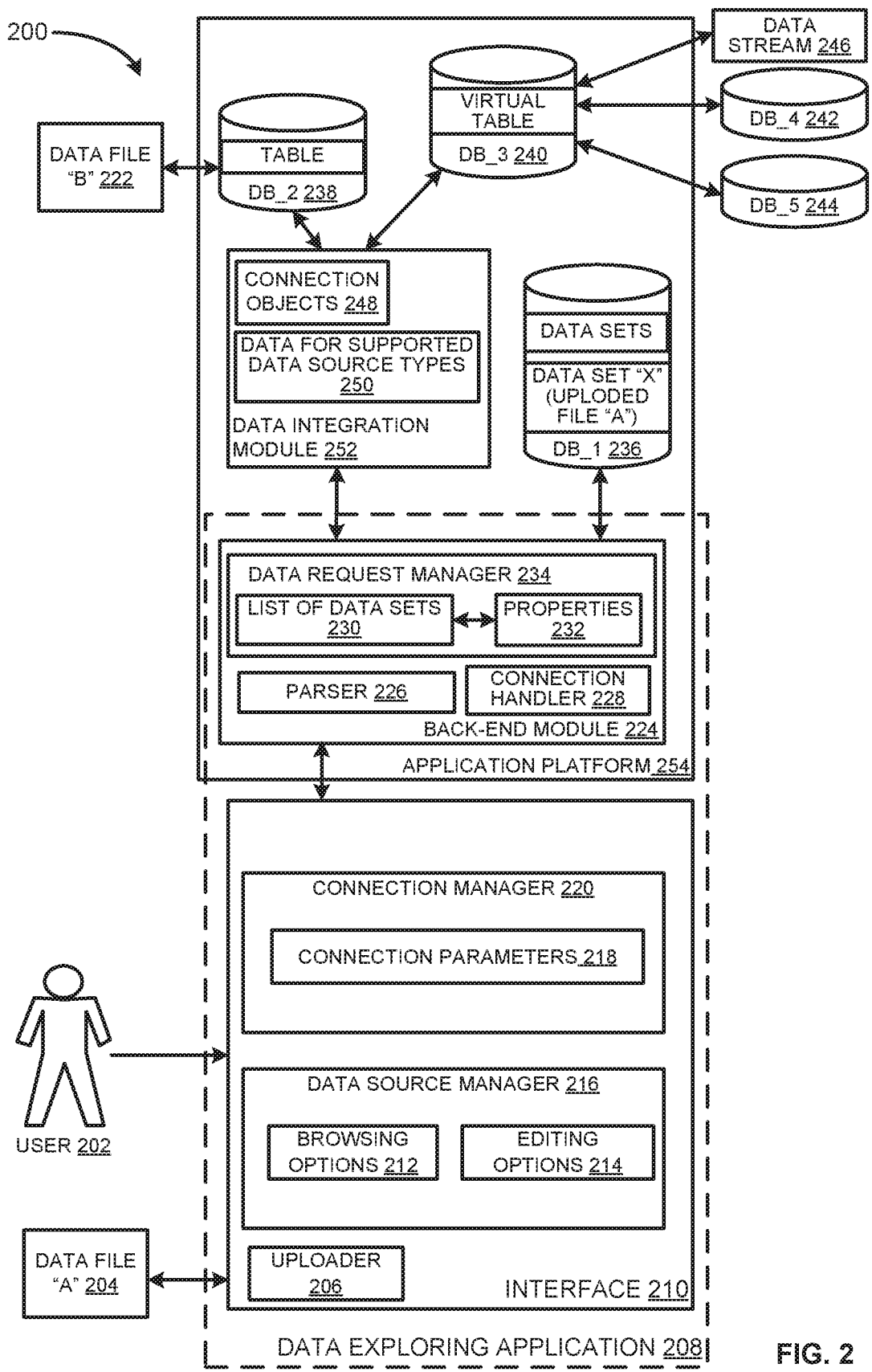
FIG. 2 is a block diagram illustrating a data exploring application connected to an application platform, associated with a database system, according to one embodiment.

FIG. 2 is a block diagram 200 illustrating a data exploring application 208 connected to an application platform, associated with a database system, according to one embodiment. The data exploring application 208 may correspond to the data exploring application 102, FIG. 1. The data exploring application 208 includes an interface 210 and a back-end module 224. The interface 210 provides options for a user 202 to communicate and serve user requests associated with managing remote data sources. The user requests may be associated with defining connections with data sources and exploring hierarchies of data sets of connected data source.

The interface 210 includes a connection manager 220, a data source manager, and an uploader 206 module. User 202 may interact with the interface 210 to define connections to data sources, to request data from connected data sources, to upload data on connected data sources, to interact with data received from connected data sources, etc. A connection with a data source is defined through the connection manager 220 by defining connection parameters 218. The connection parameters 218 are specific for the defined connection and the type of the data source. The type of the data source is associated with a set of requirements for defining a connection and managing data communication The data source manager 216 provides browsing options 212 and editing options 214 related to connected data sources to the data exploring application 208. The data source manager 216 may receive requests for exploring hierarchy of data sets of a requested data source, which is connected to the data exploring application 208. Such requests may be handled by the browsing options 212, which provide a list of connected data sources. For example, a requested data source may comprise a number of tables, where a table is perceived as a data set. The number of data sets may be explored together with metadata for the data sets. Metadata for the data sets may include table names, column names, column data types, table characteristics and/or properties, aggregation type of data values within columns, and so on.

The back-end module 224 of the data exploring application 208 may be deployed on an application platform 254. The back-end module 224 interacts with the interface 210 to provide functionality for managing data sources. The back-end module 224 communicates with the interface 210 to serve requests received by users such as user 202. When a request by user 202 is received at the interface 210, the interface 210 transfers information from the request to the back-end module 224. The received request may be for establishing a connection with a data source, or for navigating with a data structure of a data set stored at a connected data source. User 202 may request to upload a data file "A" 204 through the uploader 206 module on a selected data source. The data source used for storing the uploaded data file "A" 204 is connected to the data exploring application 208.

The application platform hosts a data request manager 234, the back-end module 224, and DB_1 236. The data integration module 252 may be such as the data integration module 185 in FIG. 1. The data integration module 252 includes connection objects 248 and data for supported data source types 250, corresponding to the included connection objects 180 and data for supported type of data sources 175 in the data integration module 185 in FIG. 1. The back-end module 224 of the data exploring application 208 communicates with the data integration module 252 when defining connections with data sources and when exploring data within the connected data sources.

The back-end module 224 of the data exploring application 208 includes a data request manager 234, a parser 226, and a connection handler 228. The connection handler 228 receives requests from the connection manager 220 to establish a connection with a defined data source. The data request manager 234 includes a list of data sets 230. The list of data sets 230 comprises data about the data sets associated with the connected data sources defined through the connection manager 220. The list of data sets 230 is associated correspondingly with properties 232 for the data sets. The properties may include metadata for the data sets, such as a table name, a type of a subset of data from the data set, column names defined for the data sets, and other.

The parser 226 is associated with the uploader 206 module from the interface 210. When a request to upload a data set, for example, the data file "A" 204, is received, the uploader 206 module sends the received file to the parser 226. The uploaded file is parsed at the back-end module 224 and stored at a predefined storage. For example, the request for uploading the data file "A" 204 may define that the file is to be stored at the application platform 254. Content of the data file "A" 204 is a data set "X", which is stored at the DB_1 236 on the application platform 254. DB_1 236 may further comprise other data sets.

The data integration module 252 is associated with data sources DB_2 238 and DB_3 240. DB_2 238 and DB_3 240 include data from external data sources. The external data sources may be of different type. The external data sources may be databases, data files, data streams, etc. The connected external data sources to the data exploring application 208 are data file "B" 222, data stream 246, DB_4 242, and DB_5 244. The data from these external data sources is includes in DB_2 238 and DB_3 240. DB_2 238 includes a database table that stores data sets from a data file "B" 222. DB_3 240 includes a virtual table, which includes data sets from 3 different data sources—data stream 246, DB_4 242, and DB_5 345. The data integration module 252 is also associated with a local data source—DB_1 236, which comprises local data sets.

The data exploring application 208 may connect with the external data sources in the same manner as connecting to the local data sources. The definition of the connection is handled by the connection manager 220, which communicates with the data request manager 234 to establish the connections. The interface 210 may receive a request to define a connection with an external data source for the application platform 254, and also for defining a connection to a local data source. The definition of the connection is established through the connection manager 220, which configures connection parameters 218 for requested connections. For example, a request for defining a connection with an external data source such as data stream 246 may be received at the connection manager 220. The connection manager 220 communicates with the back-end module 224 to configure required parameters for establishing the connection with the data stream 246. The data stream 246 may be associated with a defined set of parameters required for establishing a connection, which are provided at the connection manager 220 on the interface 210. The connection manager 220 may also receive a request to establish a connection with a local database for the application platform 254, such as the DB_1 236. The requested local database may also define configuration parameters requested for establishing a connection. The required parameters are communicated by the back-end module 224 to the connection manager 220 on the interface 210 of the data exploring application 208. When the required parameters, for either a local connection or an external connection, are provided on the interface 210, a user such as user 202 may define values for the parameters in order to set up the requested connection. Management of data sources, both local and external to the application platform 254, is handled by the data exploring application in a common manner. The back-end module 224 also handles different requests for interacting with data associated with connected data sources received through the data source manager 216 on the interface 210. Through the interface 210 the data associated with the connected data sources may be browsing or for editing. The interacted-with data may be metadata for the data sets included in the data sources. Through the interface 210 of the data exploring application 208, metadata for the data sets from connected data sources may be explored, filtered and updated. Based on such interaction with the data sets, a definition of requested data from the data source may be provided and invoked from the data source to the data exploring application 208.

Figure 3:
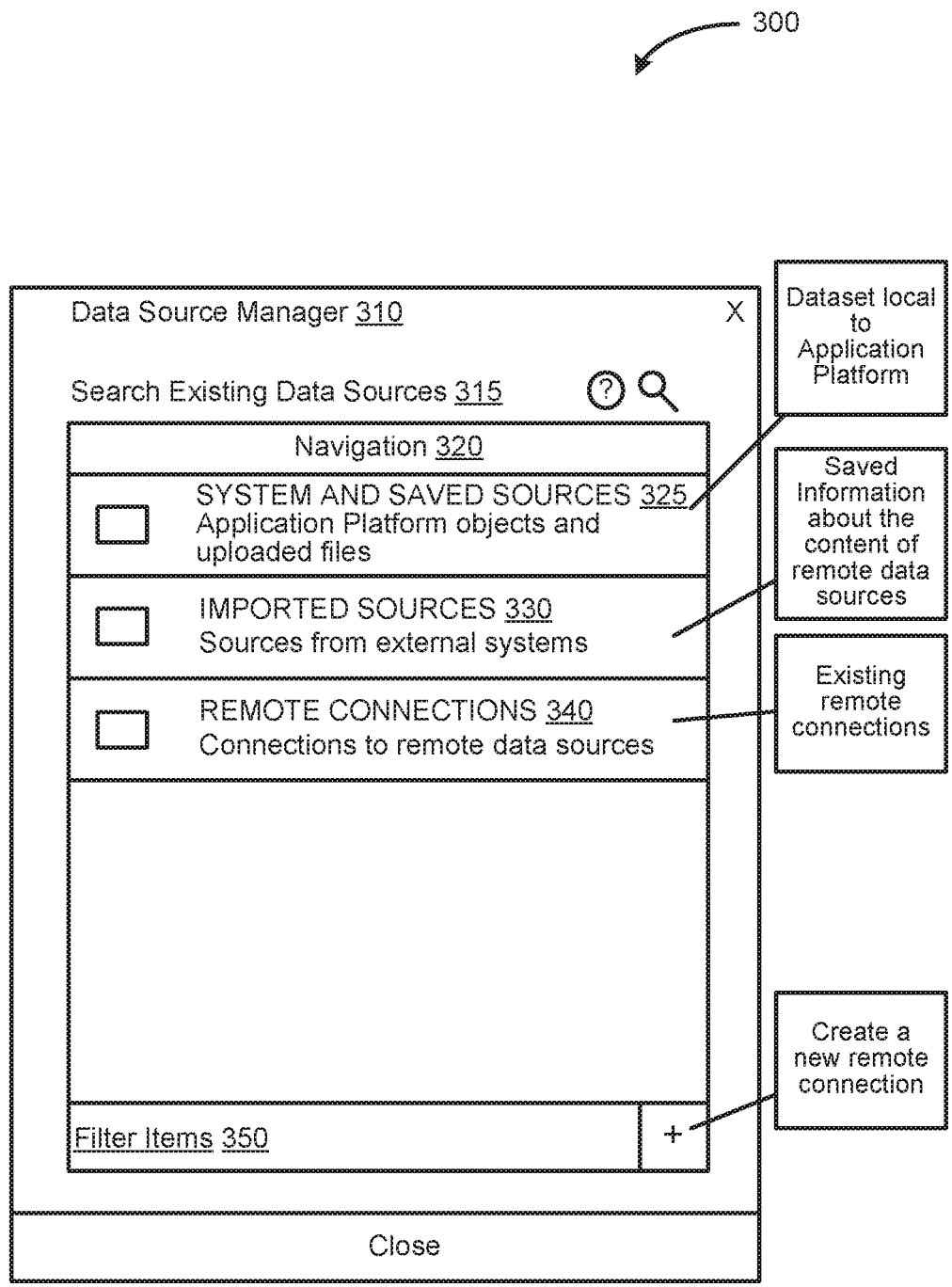
FIG. 3 is a diagram illustrating a screenshot of an exemplary interface of a data source manager provided by a data exploring application, according to one embodiment.

FIG. 3 is a diagram illustrating a screenshot of an exemplary interface 300 of a data source manager 310 provided by a data exploring application, according to one embodiment. The data exploring application may be such as the data exploring application 102, FIG. 1 and the data exploring application 208, FIG. 2. The data source manager 310 may be such as the data source manager 120, FIG. 1 and the data source manager 216, FIG. 2. The data source manager 310 may be used to navigate, browse, edit, etc. data associated with data sources. The data sources are connected to the data exploring application. The connection between the data sources and the data exploring application may be defined through the interface of the data exploring application.

The data source manager 310 is part of the interface of the data exploring application and provides browsing options for a user. Through the data source manager 310 the user interaction with data from the different data sources. The user may be a business analyst who explores data for a defined purpose. When a request for exploring data sources is received at the data source manager 310, the back-end module of the data exploring application sends to the data source manager 310 a list of available options. The list of available options may be such as the list of data sources provided in a Navigation 320 panel. The Navigation 320 panel may group the data sources, which are available for browsing, based on the types of the data sources. The back-end module may respond to requested interactions from users through the data source manager 310 based on communication with the data sources.

The data source manager 310 may receive requests for exploring a hierarchy of data sets within a selected data source. The data source may be selected from the interface 300. For example, the data source may be searched through a provided search field—"Search Existing Data Sources" 315. In the search field 315, a user may enter a name of a data source, which is connected to the data exploring application. The interface 300 includes a navigation 320 panel. The navigation 320 panel includes 3 sections, which divide the data sources which may be find through the data source manager 310. The navigation 320 panel includes a section for "System and Saved Sources" 325, a section for "Imported Sources" 330, and a section for "Remote Connections" 340. The section 325 includes data sets, which are local to an application platform where the data exploring application is running. The application platform may be such as the application platform 254, FIG. 2. The section 330 includes data sets, which are imported from external systems into the application platform hosting the data exploring application. The section 340 includes data sets from remote data sources, which are connected to the data exploring application. Through the interface 300 of the data source manager 310, a new connection to a data source may be initiated, through the "+" option for creating a new remote connection. Through the "+" option, a connection manager such as the connection manager 220, FIG. 2 may be invoked and a new connection may be configured. For configuring a new connection, a set of requirement parameters for the configuration of the connection are to be provided, for example, by the user requesting the connection. From "Filter Items" 350 field, a filter criterion may be defined for displaying a filtered set of data sources within the navigation 320 panel.

The Navigation 320 panel includes sections, which are elements that contain information for the associated data sources. The sections may be defined as elements with a common structure for including the information. For example, for section 325—"System and Saved Sources" may be associated with structured information in the format presented in Table 1.

TABLE 1 name: "System and Saved Sources"
description: "Application platform objects and uploaded files"
permission: [ ]
type: "folder"
url: "datasources2/-1/"

If a user wants to browse the local data sets saved on an application platform where the data exploring application runs, then the user selects the suitable UI element corresponding to section 325—"System and Saved Sources" on a first screen displayed for the data source manager 310. This interaction causes the frontend to request the content of this folder. The data source location may be defined through a provided Unified Resource Locator (URL). The property "URL" of the selected section defines location information for the selected section. The location information defines how the content of this item can be accessed by the interface of the data exploring application. The selection request is sent from the data source manager 310 to the back-end module of the data exploring application. The response of this request is returned from the back-end module to the interface 300 of the data source manager 310. The response is structured in the same way as the response of the initial request for providing available sections in the Navigation 320 panel. The response may have a structure description as presented in Table 2

TABLE 2 name: "APPLICATION_BASE"
description: ""
permission: [ ]
type: "folder"
url: "datasources2/-1/APPLICATION_BASE/"

The user can select the item, which appears on a screen of the interface 300 of the data source manager 310 as "APPLICATION_BASE". The procedures of exploring the different hierarchy level of a selected data source can be continued until the user explores the entire structure of the local data sets associated with in section 325. A data set from a first hierarchy level of the data source provided on a first screen of the interface 300 may include data sets from a second hierarchy level of the data source. The second hierarchy level is a deeper level into the hierarchy compared to the first hierarchy level. The second hierarchy level may be provided on one or more sequential screens on the interface 300 based on user requested selections for exploring the hierarchy. Exploring the data hierarchy does not require the user to know how the hierarchy works or what kind of elements, part of the data source, are browsed. The user may browse within the hierarchy until he reaches elements, which contain actual data. For example, such elements may have the structure description as in Table 3.

TABLE 3 name: "ManyCols"
description: ""
permission: ["DELETE"]
type: "table"
url: "datasources2/-1/APPLICATION_BASE/204048_T_COLUMN/?table=1"

When the business analyst selects an element of the type "table", the data source manager 310 sends the same request to the back-end but receives a different response. The different response causes the interface 300 to render the result as a list of columns of a table instead of a list of folders and/or tables. At such a point the user has reached an end point in the hierarchy of the selected data source.

Modifying an Entity

The interface of a data exploring application, such as the discussed applications at FIG. 1, FIG. 2, and FIG. 3, provides a list of entities, which may be data sources of different types, folders or tables part of a selected data source, and/or created connections. The entities may have a property "permissions", which defines whether the entity may be modified based on determined authorization rights. If the property has the permission "edit", the entity can be edited. The editing may be performed by an end user. The property may cause the interface to display an "edit" icon in the header of the data source manager to identify that the entity is editable. When the user selects the edit icon, the interface changes its behavior from a read-only mode into an edit mode, so the user can change the content of the entity. In order to apply the changes to the back-end module of the data exploring application, the interface sends a message (for example, an Hypertext Transfer Protocol (HTTP) post message) to an endpoint containing the original entity. The original entity at the back-end module is updated with the changes requested by the user. Entities, which are deletable may be also indicated on the interface of the data exploring application as the editable entities. The entity property "permissions" is defined by the indicator "delete", when the entity is deletable. When the requests to delete an entity, the interface of the data exploring application may send a message, such as an HTTP DELETE message, to the endpoint of the requested entity.

Figure 4:
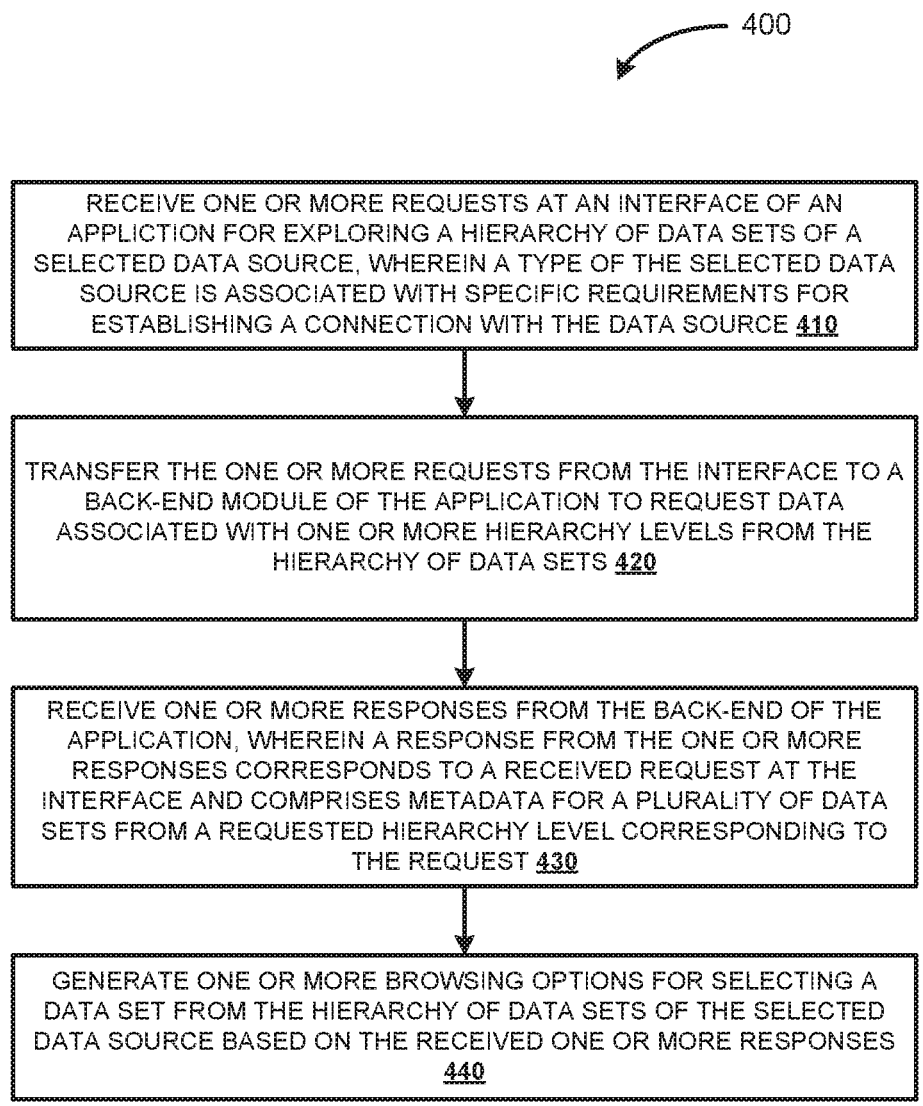
FIG. 4 is a flow diagram illustrating a process for managing data sources, according to one embodiment.

FIG. 4 is a flow diagram illustrating a process 400 for managing data sources, according to one embodiment. At 410, one or more requests are received at an interface of an application for exploring a hierarchy of data sets of a selected data source. The application for managing data sources with a data exploring application, such as the data exploring applications discussed in relation to FIG. 1, FIG. 2, and FIG. 3. The application may comprise an interface and a back-end module as described in relation to FIG. 1 and FIG. 2. The selected data source is of a given type, which is associated with specific requirements for establishing a connection between the application and the data source. At 420, the one or more requests are transferred from the interface to a back-end module of the application to request data associated with one or more hierarchy levels from the hierarchy of data sets. The requested data are associated with hierarchy levels, which are defined with the received requests at 410. The one or more transferred requests at 420, are based on location information associated with the one or more requested hierarchy levels from the hierarchy of the data sets. The location information defines the location of a corresponding hierarchy level at the data source, where the data set resides. The location information is stored at the interface and is transferred to the back-end module during 420.

At 430, one or more responses from the back-end module of the application are received in response to the sent one or more requests from the interface. A response from the one or more responses corresponds to a received request at the interface. The response includes metadata for a plurality of data sets from a requested hierarchy level corresponding to the received request. At 440, one or more browser options are generated based on the received responses. The browsing options include options for selecting a data set from the hierarchy of data sets of the selected data source based on the received one or more responses.

Figure 5:
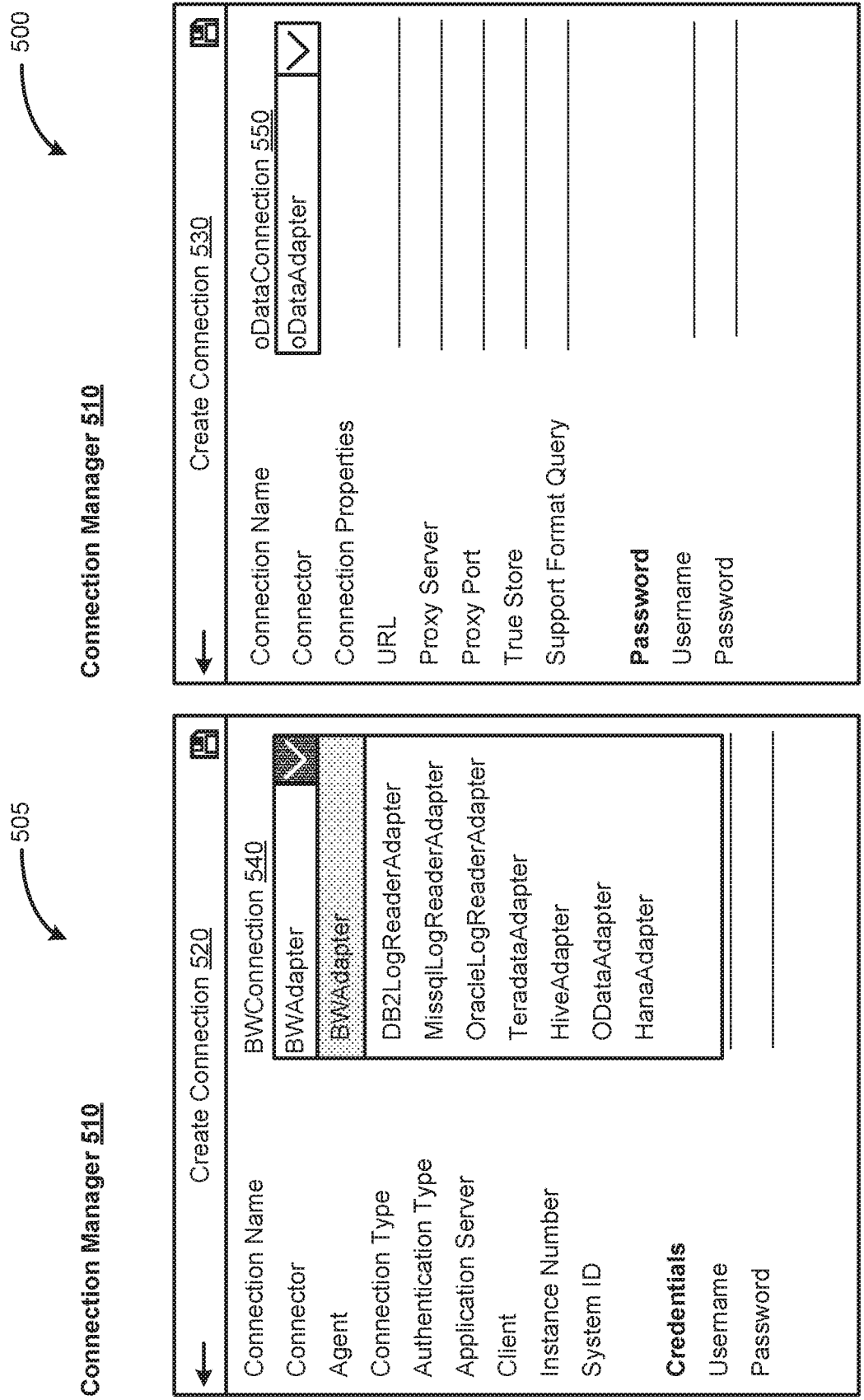
FIG. 5 is a diagram illustrating screenshots of exemplary interfaces from a data source manager provided by a data exploring application, according to one embodiment.

FIG. 5 is a diagram illustrating screenshots 505 and 500 of an exemplary interface from a connection manager 510 provided by a data exploring application, according to one embodiment. The data exploring application may be such as the data exploring application discussed in relation to FIG. 1, FIG. 2, FIG. 3, FIG. 4 and FIG. 5. The data exploring application may provide an interface, such as a user interface to communication with end users. The interface may provide the connection manager 510 for establishing connections with data sources. The interface may also include a data source manager for providing browsing and editing options associated with connected data sources to the data exploring application. A data exploring application may have connections to data sources, which provide data. Such data may be in form of data sets and may be structured data. The data sets may be defined in a hierarchical manner, and the included data may be browsed through different hierarchical levels. Further, a data source may comprise a set of folders and/or tables, where a folder from the set may include a number of tables with different number of table sheets, columns, properties, etc. The hierarchy of data from such a data source may be explored through the data exploring application.

In one embodiment, a remote data source is a system that has a unique way of being connected to. The connection requires specific parameters to be configured properly. Those parameters may define the location of the remote system, the type of a connection which needs to be established, the security mechanism which needs to be applied to the connection, and/or the identity of the user, who wants to connect to the system. These parameters can be mandatory and may have different types like strings, numbers, Booleans values or a certain value out of a predefined list.

Remote data sources may have one or more common configuration properties for configuring connections. The connection name as well as the type of the remote data source may be common configuration properties for setting up a connection with any kind of a data source. The back-end of the data exploring application includes information about supported remote system types and may send a list of those to the interface of the data exploring application. The list of supported remote system types may be provided to the user through the connection manager 510, when the user requests to create a new connection. As soon as the user defines the type of remote system he wants to connect to, the connection manager 510 requests information about the type specific parameters and adapters. The user may set up values for these parameters to configure the requested connection.

Exemplary screenshots 505 and 500 include definitions of configuration properties for establishing connections with two data sources of different type. The connections may be defined between the data exploring application and two different data sources, which provide data sets for managing through an interface of the data exploring application. The connections are defined through the connection manager 510.

In one embodiment, the connection manager 510 receives information about a request for establishing a connection with a particular data source. The type of the data source is identified. Based on the type of the data source, which is requested for connecting, a set of configuration parameters are communicated at the connection manager 510, as part of the interface of the data exploring application. On screenshot 505, a connection 520 is configured, and on screenshot 500, a connection 530 is configured. The connection 520 has a defined connection name—BWConnection 540. The connection 530 has a defined connection name—oDataConnection 550. The screenshots 505 and 500 display the required configuration parameters for defining the requested connections 520 and 530. The required configuration parameters are associated with the type of data source, which is requested. The connection manager 510 from screenshot 505 communicates with a back-end module of the data exploring application to determine and display the required parameters for the specified type. For example, for the connection 520, the configuration parameters that are to be defined by a user include parameters such as a connection name, a connector, an agent, a connection type, an authentication type, an application server, a client, etc. The connection 530 requires different configuration parameters, such as illustrated on screenshot 500—a connection name, a connector, connection properties, URL, Proxy Server, etc.

The provided configuration parameters are set to particular values in order to establish the connection. For example, the configuration parameters may be set up by the user of the data exploring application. A configuration parameter from the list of required parameters may be associated with a set of predefined values. For example, on screenshot 505, the connector parameter is associated with a drop-down list of predefined values for the connectors that are available for the connection 520. The connection manager 510 from screenshot 505 communicates the list of available values on the interface of the data exploring application based on received information from the back-end module of the data exploring application. The back-end module of the data exploring application includes information about the requirements for different data sources. The data exploring application may support a set of types of data sources, for which connections may be maintained and data may be managed.

When configuring a connection with a data source, an authentication from the user may be required. For example, the user may be prompted to provide user credentials including a username and a password to authenticate in front of the data exploring application and the requested data source to identify user's access right.

While the form including the connection configuration parameters is filled out, for example by a user, the connection manager 510 enriches the original data structure of the back-end module of the data exploring application with the provided configuration information. When the connection is going to be established, the data structure for the connection configuration is being sent the back-end module. The communication between the interface of the data exploring application including the connection manager 510 and the back-end module of the data exploring application is presented in FIG. 6.

Browsing a Connected Data Source

If a user wants to browse a remote data source he had defined a connection with in a data exploring application (e.g. data exploring application discussed in FIG. 1, FIG. 2, FIG. 3, FIG. 4, and FIG. 5), he has to select the suitable list item on the initial screen interface 300 of the data source manager (e.g. the list in the data source manager 310. FIG. 3). Such user interaction causes the interface of the data exploring application to request the same kind of a request, when the explored data source is a local data source or a remote data source. Even though the back-end module of the data exploring application performs different operations to browse data source of different type, the data source manager may provide the look and feel to the user when exploring any connected data source. The user is able to browse through every hierarchy level of the created remote connections to data source and to existing local connections to data source. The user is provided with browsing and editing functionality and does not recognize or identify what kind of data source he is exploring. The data exploring application may provide through the application interface a capability of managing supported types of data sources containing data sets in a homogenous way.

Figure 6:
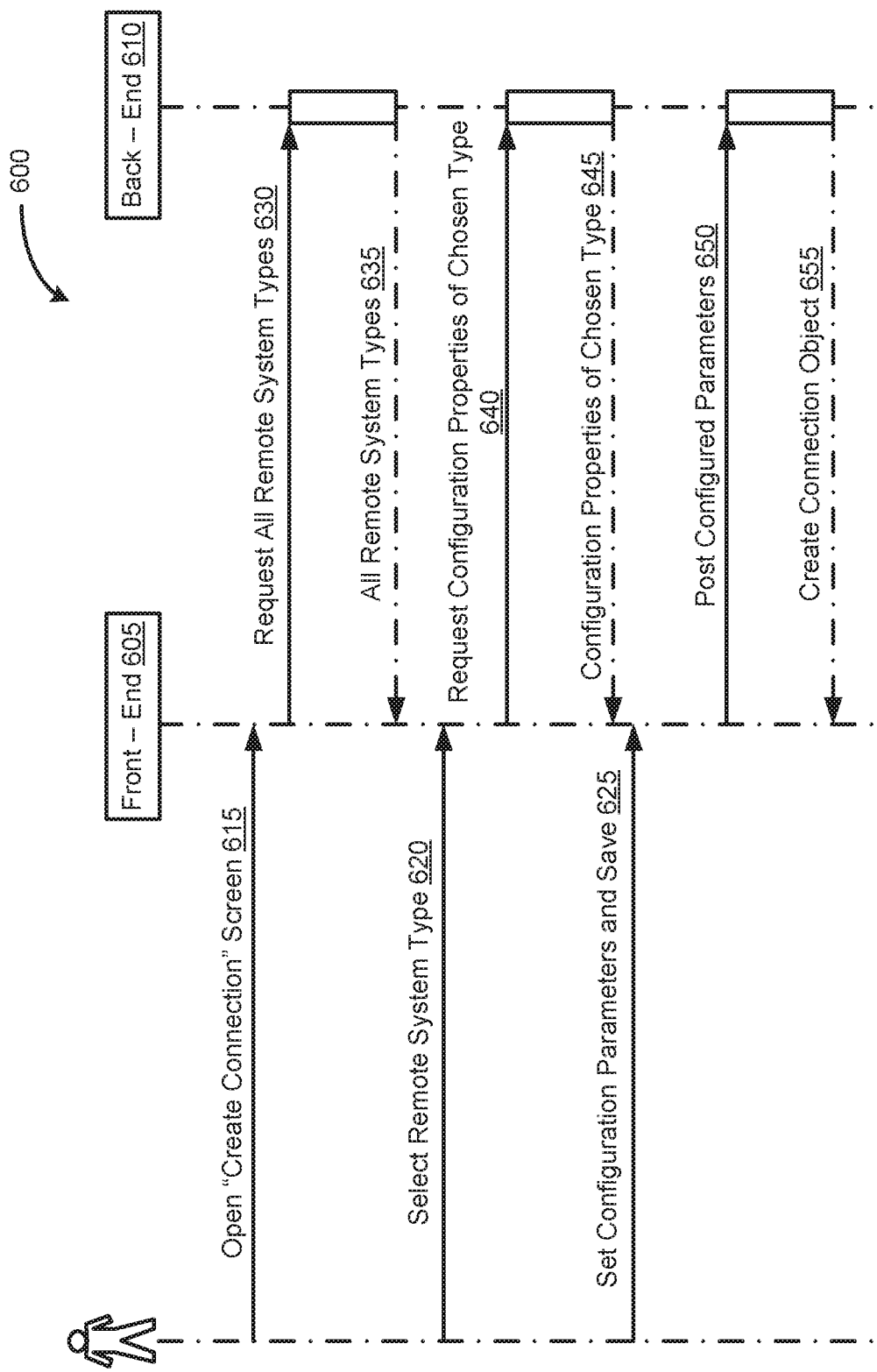
FIG. 6 is a sequence diagram illustrating communication between components of a data exploring application in relation to managing data sources, according to one embodiment.

FIG. 6 is a sequence diagram 600 illustrating communication between components of a data exploring application in relation to managing data sources, according to one embodiment. The data exploring application may be such as the data exploring application discussed in relation to FIG. 1, FIG. 2, FIG. 3, FIG. 4 and FIG. 5. The data exploring application may provide an interface, such as a user interface to communication with end users. The interface is a front-end module of the data exploring application. The data exploring application includes a back-end module including application logic for connecting with data sources to the data exploring application and for providing navigation functionality for exploring data within data hierarchies of the connected data sources. The data sources may be of different type and may be both local and remote. The type of a data source may be associated with a set of requirements for defining a connection with and managing data communication. The set of parameters may be uniquely related to the type of the data source. The data sources may be local for the application platform hosting the data exploring application. For example, the local data sources may be local databases running on the application platform, where the data exploring application runs. The connection and navigation within data hierarchies is provided through the interface of the data exploring application for supported types of data sources. The establishing of a connection and navigation within data sources is handles in a common way for supported types of data sources through the front-end (interface) of the data exploring application.

A user may communicate with a front-end 605 of the data exploring application. The front-end 605 may correspond to the interface 210, FIG. 2. The user may send a request at 615 to open a "Create Connection" screen on the front-end 605. The front-end 605 then sends a request 630 to a back-end module 610 of the data exploring application. The request 630 is a request for remote system types that are supported for establishing a connection with by the data exploring application. The back-end module 610 processes the request 630 and returns a response 635 to the front-end 605, with information about the remote system types. Based on the received response at the front-end 605, the user may select at 620 a remote system type. Based on the received selection at the front-end 605 about the remote system type, the front-end 605 sends a request 640 to the back-end module 610 for providing configuration properties definition for the chosen system type by the selection at 620. At 645, the back-end module 610 provides to the front-end 605 the requested definition for configuration properties of the chosen system type. Based on the provided definition of configuration properties that are required for establishing a connection with the selected system type, the user may configure the connection at 625. The user defines the configuration of the connection through providing parameters for the provided configuration properties and saving the configuration at the front-end 605. Based on the received configuration for establishing the connection, at 650, the front-end 605 posts the received configuration parameters from the user to the back-end module 610. The back-end module 610 creates a connection object at 655 based on the received configuration parameters 650. The back-end module 610 notifies the front-end 605 of the defined connection, and the user may be provided with a notification about the result of the requested creation of a connection at 615 based on the provided configuration parameters at 625 for the selected remote system type 620.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and random access memory (RAM) devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
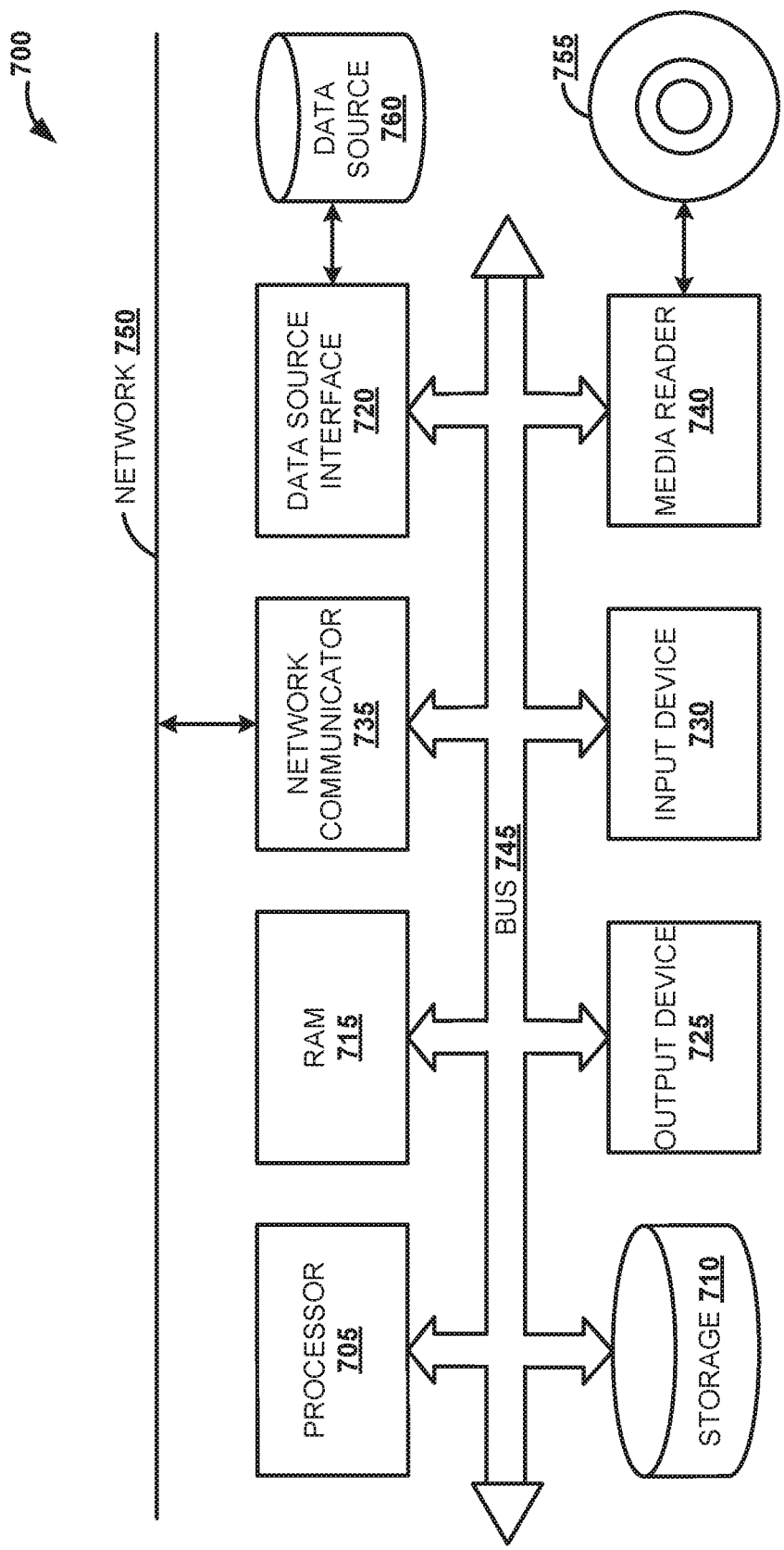
FIG. 7 is a block diagram illustrating an embodiment of a computing environment in which the techniques described for managing data sources can be implemented.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in RAM 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The processor X05 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., Extensible Markup Language (XML) data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for managing data sources, the method comprising:
    receiving one or more requests at an interface of an application from a user to establish a remote connection;
    transferring the one or more requests from the interface to a back-end module of the application to request data corresponding to establishing the remote connection;
    receiving one or more remote system types from the back-end module;
    receiving user selection of a data source from the one or more remote system types;
    generating a connection to the selected data source based on a set of parameters for the connection, wherein the set of parameters are uniquely related to a type of the selected data source and wherein the set of parameters comprises:
    common configuration parameters applicable to all data sources; and connection specific parameters applicable to a particular connection;

after generating the connection to the selected data source:

receiving, by the interface, data source groups of a plurality of data sources from the back end module, wherein the groups comprise a group for data sets that are local to the application platform, a group for data sets that have been imported from a remote source, and a group for remote sources that are connected to the application platform;

displaying, by the interface, a selectable option corresponding to each data source group for navigation of the data source group;

receiving user selection of a data source group;

receiving a plurality of second user selections of a hierarchy of data sets of the selected data source group, the plurality of user selections comprising one or more requests for one or more hierarchy levels and one or more requests for editing one or more entities stored in the data sets;

transferring the plurality of second user selections from the interface to the back-end module of the application, wherein the one or more requests for one or more hierarchy levels are associated with location information for the one or more requested hierarchy levels from the hierarchy of the data sets, wherein the location information is displayed at the interface, and wherein the one or more requests for editing one or more entities cause the back-end module to edit the one or more entities based on the editing request;

in response to receiving the requests for one or more hierarchy levels, receiving one or more responses from the back-end module of the application, wherein the one or more responses comprises metadata for a plurality of data sets from a requested hierarchy level; and generating, by the interface, one or more browsing options to receive an additional user selection of a data set from the hierarchy of data sets of the selected data source group based on the received one or more responses.

2. The method of claim 1, wherein the interface of the application is instantiated to manage requests from end users, wherein the interface is coupled to the back-end module of the application to provide interactions with a plurality of data sources having different types, wherein a type of a data source is associated with a set of requirements for establishing the connection and managing data communication.

3. The method of claim 1, wherein the selected data source is selected from a set of data sources of different types that are related to the application.

4. The method of claim 1, wherein one or more of the plurality of second requests transferred to the back-end module of the application and the one or more responses received at the interface have a common structure comprising metadata for the data sets from different hierarchy levels from the hierarchy of the selected data source group.

5. The method of claim 1,
wherein the set of parameters are provided at the interface based on input provided by the back-end module of the application, and
wherein the back-end module communicates with the connected remote data source based on received interactions from the interface of the application associated with data from the connected remote data source.

6. The method of claim 5, further comprising:
providing a list of browsing options for navigating within the hierarchy of data sets of the selected data source and within the connected remote data source.

7. The method of claim 1, wherein a data set from a first hierarchy level comprises one or more data sets from a second hierarchy level, wherein the second hierarchy level is a deeper level into the hierarchy compared to the first hierarchy level.

8. The method of claim 1, wherein the common configuration parameters comprise at least one of connection name or type of data source.

9. The method of claim 1, wherein the connection specific parameters comprise at least one of a type of connection, a security mechanism, a location of the remote system, or a user identity.

10. A computer system to manage data sources, comprising:
a processor to execute a program code; and
a memory coupled to the processor, the memory storing the program code, the program code causing the processor to perform:
receiving one or more requests at an interface of an application from a user to establish a remote connection;
transferring the one or more requests from the interface to a back-end module of the application to request data corresponding to establishing the remote connection;
receiving one or more remote system types from the back-end module;
receiving user selection of a data source from the one or more remote system types;
generating a connection to the selected data source based on a set of parameters for the connection, wherein the set of parameters are uniquely related to a type of the selected data source and wherein the set of parameters comprises:
common configuration parameters applicable to all data sources; and
connection specific parameters applicable to a particular connection;
after generating the connection to the selected data source:
receiving, by the interface, data source groups of a plurality of data sources from the back end module, wherein the groups comprise a group for data sets that are local to the application platform, a group for data sets that have been imported from a remote source, and a group for remote sources that are connected to the application platform;
displaying, by the interface, a selectable option corresponding to each data source group for navigation of the data source group;
receiving user selection of a data source group;
receiving a plurality of second user selections of a hierarchy of data sets of the selected data source group, the plurality of user selections comprising one or more requests for one or more hierarchy levels and one or more requests for editing one or more entities stored in the data sets;
transferring the plurality of second user selections from the interface to the back-end module of the application, wherein the one or more requests for one or more hierarchy levels are associated with location information for the one or more requested hierarchy levels from the hierarchy of the data sets, wherein the location information is displayed at the interface, and wherein the one or more requests for editing one or more entities cause the back-end module to edit the one or more entities based on the editing request;

in response to receiving the requests for one or more hierarchy levels, receiving one or more responses from the back-end module of the application, wherein the one or more responses comprises metadata for a plurality of data sets from a requested hierarchy level; and generating, by the interface, one or more browsing options to receive an additional user selection of a data set from the hierarchy of data sets of the selected data source group based on the received one or more responses.

11. The system of claim 10, wherein the interface of the application is instantiated to manage requests from end users, wherein the interface is coupled to the back-end module of the application to provide interactions with a plurality of data sources having different types, wherein a type of a data source is associated with a set of requirements to establish the connection and managing data communication.

12. The system of claim 10, wherein one or more of the plurality of second requests transferred to the back-end module of the application and the one or more responses received at the interface have a common structure comprising metadata for the data sets from different hierarchy levels from the hierarchy of the selected data source group.

13. The system of claim 10,
wherein the set of parameters are provided at the interface based on input provided by the back-end module of the application; and
wherein the program code causes the processor to further perform:
providing a list of browsing options to navigate within the hierarchy of data sets of the selected data source and within the connected remote data source,
wherein the back-end module communicates with the connected remote data source based on received interactions from the interface of the application associated with data from the connected remote data source.

14. The system of claim 10, wherein a data set from a first hierarchy level comprises one or more data sets from a second hierarchy level, wherein the second hierarchy level is a deeper level into the hierarchy compared to the first hierarchy level.

15. A non-transitory computer-readable medium storing instructions, which when executed cause a computer system to perform operations comprising:
receiving one or more requests at an interface of an application from a user to establish a remote connection;
transferring the one or more requests from the interface to a back-end module of the application to request data corresponding to establishing the remote connection;
receiving one or more remote system types from the back-end module;
receiving user selection of a data source from the one or more remote system types;
generating a connection to the selected data source based on a set of parameters for the connection, wherein the set of parameters are uniquely related to a type of the selected data source and wherein the set of parameters comprises:
common configuration parameters applicable to all data sources; and
connection specific parameters applicable to a particular connection;

after generating the connection to the selected data source:
receiving, by the interface, data source groups of a plurality of data sources from the back end module, wherein the groups comprise a group for data sets that are local to the application platform, a group for data sets that have been imported from a remote source, and a group for remote sources that are connected to the application platform;
displaying, by the interface, a selectable option corresponding to each data source group for navigation of the data source group;
receiving user selection of a data source group;
receiving a plurality of second user selections of a hierarchy of data sets of the selected data source group, the plurality of user selections comprising one or more requests for one or more hierarchy levels and one or more requests for editing one or more entities stored in the data sets;
transferring the plurality of second user selections from the interface to the back-end module of the application, wherein the one or more requests for one or more hierarchy levels are associated with location information for the one or more requested hierarchy levels from the hierarchy of the data sets, wherein the location information is displayed at the interface, and wherein the one or more requests for editing one or more entities cause the back-end module to edit the one or more entities based on the editing request;
in response to receiving the requests for one or more hierarchy levels, receiving one or more responses from the back-end module of the application, wherein the one or more responses comprises metadata for a plurality of data sets from a requested hierarchy level; and
generating, by the interface, one or more browsing options to receive an additional user selection of a data set from the hierarchy of data sets of the selected data source group based on the received one or more responses.

16. The computer-readable medium of claim 15, wherein the interface of the application is instantiated to manage requests from end users, wherein the interface is coupled to the back-end module of the application to provide interactions with a plurality of data sources having different types, and wherein a type of a data source is associated with a set of requirements to establish the connection and managing data communication.

17. The computer-readable medium of claim 15, wherein one or more of the plurality of second requests transferred to the back-end module of the application and the one or more responses received at the interface have a common structure comprising metadata for the data sets from different hierarchy levels from the hierarchy of the selected data source group.

18. The computer-readable medium of claim 15,
wherein the set of parameters are provided at the interface based on input provided by the back-end module of the application; and
wherein the operations further comprise:
providing a list of browsing options to navigate within the hierarchy of data sets of the selected data source and within the connected remote data source,
wherein the back-end module communicates with the connected remote data source based on received interactions from the interface of the application associated with data from the connected remote data source.

19. The computer-readable medium of claim 15, wherein a data set from a first hierarchy level comprises one or more data sets from a second hierarchy level, wherein the second hierarchy level is a deeper level into the hierarchy compared to the first hierarchy level.

\* \* \* \* \*